US012353016B2

(12) United States Patent
Gosai et al.

(10) Patent No.: US 12,353,016 B2
(45) Date of Patent: Jul. 8, 2025

(54) ACHROMATIC COUPLERS, ACHROMATIC VARIABLE RATIO COUPLERS, AND METHODS OF MAKING THE SAME

(71) Applicant: Corning Research & Development Corporation, Corning, NY (US)

(72) Inventors: Agnivo Gosai, Painted Post, NY (US); Jeremy Alexander Graham, Sr., Elmira, NY (US); William James Miller, Horseheads, NY (US); David Lee Weidman, Corning, NY (US); Aramais Robert Zakharian, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 206 days.

(21) Appl. No.: 17/962,721

(22) Filed: Oct. 10, 2022

(65) Prior Publication Data
US 2024/0118495 A1     Apr. 11, 2024

(51) Int. Cl.
*G02B 6/30*     (2006.01)
*G02B 6/293*    (2006.01)

(52) U.S. Cl.
CPC ......... *G02B 6/29361* (2013.01); *G02B 6/305* (2013.01)

(58) Field of Classification Search
CPC ................. G02B 6/1228; G02B 6/305; G02B 6/29361
See application file for complete search history.

(56) References Cited

U.S. PATENT DOCUMENTS

| 4,634,858 A | 1/1987 | Gerdt et al. |
| 5,011,251 A * | 4/1991 | Miller ............... G02B 6/2856 |
| | | 385/43 |
| 5,146,519 A | 9/1992 | Miller et al. |

(Continued)

FOREIGN PATENT DOCUMENTS

| WO | WO-9711917 A1 * | 4/1997 | ....... C03B 37/01211 |
| WO | 2019/036339 A1 | 2/2019 | |

OTHER PUBLICATIONS

"Variable optical power splitters create new", Retrieved from: https://www.lightwaveonline.com/fttx/pon-systems/article/16648432/variable-optical-power-splitters-create-new-apps, 2005, 14 pages.

*Primary Examiner* — Eric Wong
(74) *Attorney, Agent, or Firm* — Michael E. Carroll, Jr.

(57) ABSTRACT

In one embodiment, a coupler includes a glass tube having a refractive index $n_3$ and a passageway, a first optical waveguide and a second optical waveguide positioned within the passageway, each of the first optical waveguide and the second optical waveguide comprising a core surrounded by a cladding. The glass tube further includes a tapered region having a taper length. A coupling region is present between the first optical waveguide and the second optical waveguide within the tapered region. A refractive index of the cladding is less than a refractive index of the core, and a lowest refractive index of the cladding of the first optical waveguide and the second optical waveguide is $n_2$. Additionally, $n_3$ is lower than $n_2$ such that a value of $\Delta_{2\text{-}3}$ is $0.07\% \leq \Delta_{2\text{-}3} \leq 0.125$, where $\Delta_{2\text{-}3}$ equals $(n_2^2 - n_3^2)/2n_2^2$.

37 Claims, 10 Drawing Sheets

(56) References Cited

U.S. PATENT DOCUMENTS

| | | | | |
|---|---|---|---|---|
| 5,268,979 | A | * | 12/1993 | Weidman ............ G02B 6/2835 385/127 |
| 5,295,210 | A | * | 3/1994 | Nolan .................. G02B 6/2835 65/409 |
| 5,339,372 | A | * | 8/1994 | Miller ................. G02B 6/2856 65/412 |
| 5,965,443 | A | * | 10/1999 | Reznikoff ............. C12N 15/90 536/23.1 |
| 8,221,006 | B2 | | 7/2012 | Theuerkorn |
| 9,116,310 | B2 | | 8/2015 | Bran De Leon et al. |
| 10,247,885 | B2 | | 4/2019 | Yamaguchi et al. |
| 2020/0026005 | A1 | * | 1/2020 | Lipson ................ G02B 6/1228 |
| 2021/0103099 | A1 | | 4/2021 | Butler |

* cited by examiner

ACHROMATIC COUPLERS, ACHROMATIC VARIABLE RATIO COUPLERS, AND METHODS OF MAKING THE SAME

FIELD

The disclosure is directed to optical couplers and, more particularly, to achromatic optical couplers, achromatic variable ratio couplers and methods of making the same.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

Existing technology to manage power splitting in fiber-to-the-home (FTTH) networks is to splice in a fixed ratio coupler, typically made using fused biconic taper (FBT) technology. Couplers come in variety of fixed split ratios, 98/2, 90/10, 80/20, 70/30, 50/50, and the like. To alter the split ratio, a technician would have to remove one coupler and replace with another requiring some skill to fiber prep and splice. Fixed ratio couplers require the manufacture to fabricate many individual couplers each having its own SKU. Additionally, fixed ratio couplers also require a technician to carry many different couplers in his or her vehicle. Thus, fixed ratio couplers cause increased manufacturing and inventory costs. Fiber network installers are highly price-sensitive and are also concerned about system installation procedures that demand high skill levels in their installers.

Consequently, there exists an unresolved need for reliable couplers that are easy and cost effective to manufacture, inventory and install.

SUMMARY

Various embodiments of achromatic couplers, achromatic variable couplers, and methods of making the same are disclosed. Couplers of the present disclosure are achromatic broadband multiclad couplers capable of being mounted in a housing/package that enables the coupler to be bent in a controlled manner achieving upwards of 20 different ratio settings. These couplers are having less dependency on wavelength across the bandwidth of 1250-1650 nm. Hence, they can also be classified as wavelength flattened, wavelength independent and dual window broadband couplers. Essentially, a single SKU can be used as per demand of the network design. Also, this VRC can be utilized as a stand-alone attenuator/variable coupler for any other optical network.

VRCs incorporating such a coupler offer a robust and low-cost solution (primarily due to reliable manual adjustment) for setting the tap ratio in the field as per the network requirement and thus have an advantage over conventional fixed ratio FBT (fused biconical taper) couplers, expensive electromechanically controlled MEMS based splitters, as well as asymmetric planar lightwave circuit (PLC) splitters that operate over shorter bandwidth.

In one embodiment, a coupler includes a glass tube having a refractive index $n_3$ and a passageway, a first optical waveguide and a second optical waveguide positioned within the passageway, each of the first optical waveguide and the second optical waveguide comprising a core surrounded by a cladding. The glass tube further includes a tapered region having a taper length. A coupling region is present between the first optical waveguide and the second optical waveguide within the tapered region. A refractive index of the cladding is less than a refractive index of the core, and a lowest refractive index of the cladding of the first optical waveguide and the second optical waveguide is $n_2$. Additionally, $n_3$ is lower than $n_2$ such that a value of $\Delta_{2-3}$ is $0.07\% \leq \Delta_{2-3} \leq 0.125$, where $\Delta_{2-3}$ equals $(n_2^2 - n_3^2)/2n_2^2$.

In another embodiment, a variable ratio coupler includes a glass tube having a refractive index $n_3$ and a passageway, a first optical waveguide and a second optical waveguide positioned within the passageway, each of the first optical waveguide and the second optical waveguide comprising a core surrounded by a cladding. The glass tube further includes a tapered region having a taper length. A coupling region is present between the first optical waveguide and the second optical waveguide within the tapered region. A refractive index of the cladding is less than a refractive index of the core, a lowest refractive index of the cladding of the first optical waveguide and the second optical waveguide is $n_2$, and $n_3$ is lower than $n_2$ such that a value of $\Delta_{2-3}$ is $0.07\% \leq \Delta_{2-3} \leq 0.125$, where $\Delta_{2-3}$ equals $(n_2^2 - n_3^2)/2n_2^2$. The first optical waveguide is fixed, and the second optical waveguide is configured to be deflected relative to the first optical waveguide to change a split ratio of the variable ratio coupler.

In yet another embodiment, a method of fabricating a coupler includes positioning a first optical waveguide and a second optical waveguide into a passageway of a glass tube. Each of the first optical waveguide and the second optical waveguide comprising a core surrounded by a cladding. A refractive index of the cladding is less than a refractive index of the core, a lowest refractive index of the cladding of the first optical waveguide and the second optical waveguide is $n_2$, and $n_3$ is lower than $n_2$ such that a value of $\Delta_{2-3}$ is $0.07\% \leq \Delta_{2-3} \leq 0.125$, where $\Delta_{2-3}$ equals $(n_2^2 - n_3^2)/2n_2^2$. The method further includes applying a vacuum seal to a first end and a second end of the glass tube, heating the glass tube using a gas having a methane to oxygen ratio of 0.42 slpm to 0.84 slpm and an amount of oxygen is less than 0.90 slpm, and pulling the glass tube to form a tapered region having a taper length. A coupling region is present between the first optical waveguide and the second optical waveguide within the tapered region. One or more airlines are present between one or more of the first optical waveguide and the second optical waveguide and an inner surface of the passageway.

In yet another embodiment, a method of fabricating a coupler includes applying a vacuum seal to a first end of a glass tube having a passageway and a tapered region where the passageway is tapered, wherein a first optical waveguide and a second optical waveguide are disposed within the passageway and a coupled region between the first optical waveguide and the second optical waveguide is present within the tapered region. The method further includes applying an epoxy to a second end of the glass tube such that the epoxy flows a predetermined distance within the passageway, removing the vacuum seal from the first end, heating the second end with a heat source for a period of time, and removing the heat source after the period of time and applying the epoxy to the second end such that the epoxy flows within the passageway.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

References will now be made in detail to the embodiments of the disclosure, examples of which are illustrated in the accompanying drawings. Whenever possible, like reference numbers will be used to refer to like components or parts.

The concepts disclosed are related to achromatic optical couplers or splitters (also referred to herein as "couplers"), achromatic variable ratio couplers (VRCs), and methods of their manufacture. More particularly, embodiments of the present disclosure are directed to couplers comprising optical waveguides (e.g., single mode optical fibers) each having a core and a cladding, which are fused together along a portion of the lengths thereof to form a coupling region. A matrix glass tube of lower refractive index surrounds the two fibers, thus providing an overclad. For description purpose the core, cladding and overclad refractive indices are designated as $n_1$, $n_2$ and $n_3$ respectively. The index difference between the cladding and the overclad is thus defined as $\Delta_{2-3}=(n_2^2-n_3^2)/2n_2^2$.

The present inventors have found that for couplers made from similar optical fibers (or optical waveguides more generally), the achromaticity depends on the taper length for glass tube indices below the limit of $\Delta_{2-3}<0.125\%$ among other factors. The desired level of achromaticity can be achieved with shallower/gentler and longer tapers compared to steeper and shorter tapers of previous couplers. As used herein, "achromaticity" is defined as a maximum coupling percentage minus a minimum coupling percentage over a range of wavelengths (e.g., 1250-1650 nm).

Embodiments also include achromatic couplers made from similar optical fibers to have variable split ratio/tap ratio, thus making them suitable for VRCs, through the bending of the output end while the input is held fixed.

Various embodiments of couplers, variable ratio couplers, and methods of coupler manufacture are described in detail below.

Figure 1:
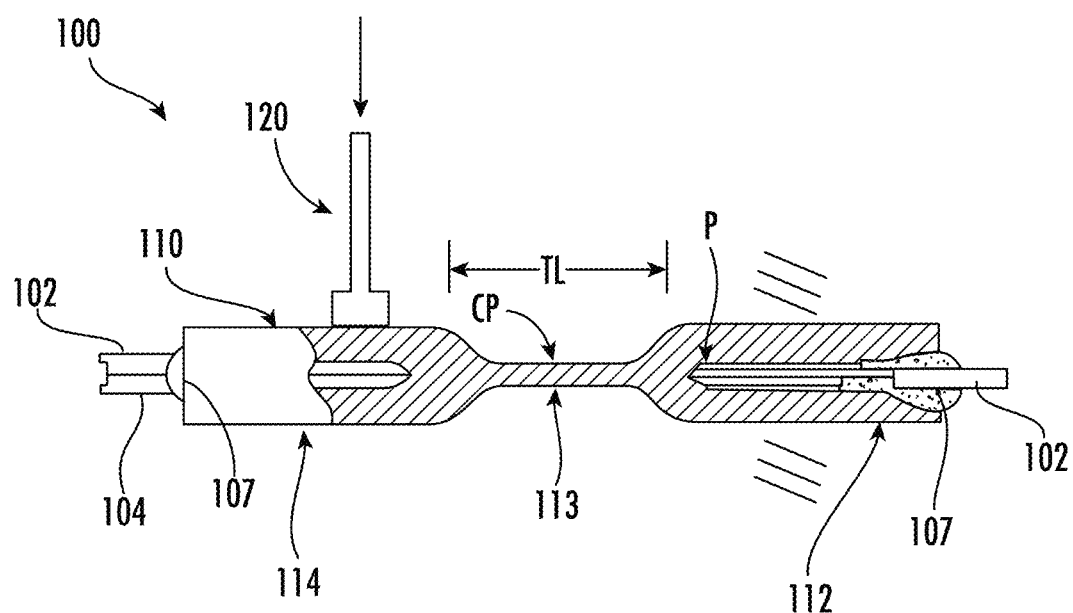
FIG. 1 illustrates an example coupler according to one or more embodiments described and illustrated herein.

Referring now to FIG. 1, an example coupler 100 is illustrated. The coupler includes a glass tube 110 having a first end 112 (i.e., an input end), a second end 114 (i.e., an output end), and a passageway P extending within the glass tube 110 from the first end 112 to the second end 114. The glass tube 110 further comprises a tapered region 113 having a taper length TL. The tapered region 113 has a smaller diameter than regions of the glass tube 110 outside of the tapered region 113.

The coupler further includes a first optical waveguide 102 and a second optical waveguide 104, each of which may be configured as a single mode optical fiber having a core and a cladding. The first optical waveguide 102 and the second optical waveguide 104 may be fabricated from similar optical fibers having substantially the same core refractive index and cladding refractive index. As a non-limiting example, SMF-28 optical fibers may be used for the first and second optical waveguides 102, 104.

The first and second optical waveguides 102, 104 are present within the passageway P of the glass tube 110. As described in more detail below, a coupling region CR is present within the tapered region 113 where a portion of the optical power of an optical signal propagating within the first optical waveguide 102 is coupled into the second optical waveguide 104. The first optical waveguide 102 operates as an input to the coupler 100 at the first end 112 of the glass tube, and as a first output of the coupler 100 at the second end 114. The second optical waveguide 104 operates as a second output of the coupler 100 at the second end 114. In some embodiments, the second optical waveguide 104 is terminated within the first end 112 of the glass tube 110 to minimize back reflections.

The first and second optical waveguides 102, 104 may be secured within the passageway P of the glass tube 110 by epoxy 107, as described in more detail below.

The present inventors have observed that the taper length TL significantly impacts the achromaticity of the coupler 100. Particularly, there is a non-linear relationship between the glass tube index of refraction and the taper length TL, which may be leveraged to achieve a desired level of achromaticity. The couplers 100 described herein include glass tubes 110 selected such that $0.07\% \leq \Delta_{2-3} \leq 0.125$, wherein $n_2$ is selected as the lowest index among the claddings of the first and second optical waveguides 102, 104. As a non-limiting example, the taper length TL may be within a range of 16 mm to 19 mm, including endpoints.

For a perfectly spectrally flat (achromatic) coupler, achromaticity will be zero. Hence, for the purpose of creating a broadband coupler, and more particularly a broadband variable ratio coupler capable of a variable split ratio, lower values of achromaticity are desirable. For demonstration purpose the effect of different taper lengths TL for a plurality of $\Delta_{2-3}$ values on the achromaticity is showed in FIG. 2.

Figure 2:
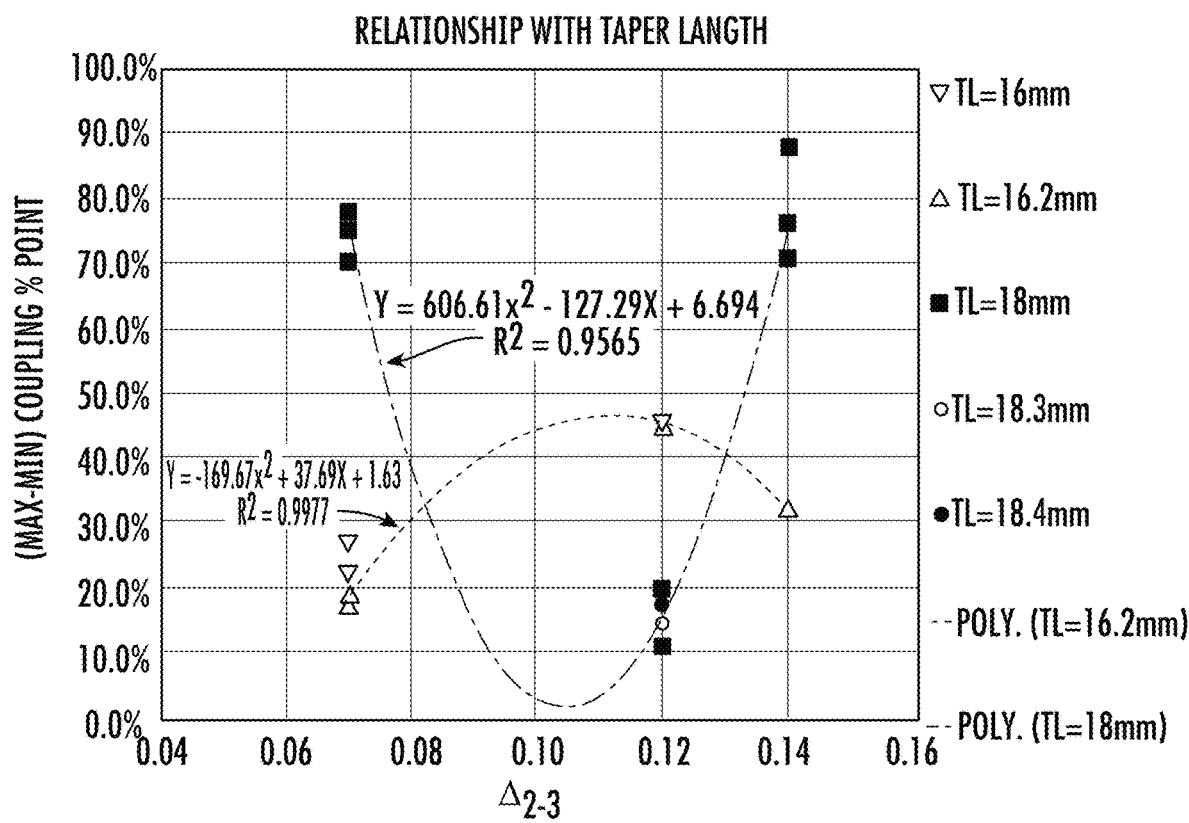
FIG. 2 illustrates a relationship of the taper length TL for different $\Delta_{2-3}$ values according to one or more embodiments described and illustrated herein.

FIG. 2 illustrates the relationship of the taper length TL (also referred to as a pull length) for couplers having different $\Delta_{2-3}$ values (x-axis) with respect to achromaticity (y-axis). The taper length TL and the $\Delta_{2-3}$ values determine different values for achromaticity when the couplers are in an unbent, straight state as shown by FIG. 2.

Couplers having two different taper lengths, namely TL=16.2 mm and TL 18 mm, were used to make the couplers illustrated by FIG. 2. From FIG. 2, it is observed that for a starting achromaticity (difference between maximum and minimum coupling percent for any of the output legs, when the fabricated coupler is unbent i.e. at neutral state) below 20 percentage points, for glass tubes with $\Delta_{2-3}$ around 0.12%, and TLs between 18-18.4. If the starting achromaticity is below 20 percentage points, it is observed that upon bending, the achromaticity gradually approaches the ideal flatness of coupling percentage across the wavelength band of 1250-1650 nm. If the glass tubes have slight variations in their index profile, then by slight adjustments of the TL, a good starting achromaticity is achievable. A polynomial curve fit for the data points with TL~18 mm and TL~16 mm is shown to illustrate the relationship between TL and $\Delta_{2-3}$ for achieving a starting achromaticity of 20% and less.

The $\Delta_{2-3}$ value is calculated based on the value of $n_3$ at the inner bore of the glass tube 110. For all theoretical purposes, $n_3$ is considered to be flat throughout the radius of the glass tube 110; however, it may decrease slightly in a direction outwards from the inner wall of the glass tube 110 (i.e., the wall of the passageway P). In the case of an upward slope, slight adjustments in taper length by increasing or decreasing it by 0.2-0.4 mm may be made to optimize the achromaticity value. It should also be kept in mind that the variability in achromaticity for these couplers, when the same taper length, optical waveguides and glass tubes are used, is also impacted by the coupler draw process variability which may be given by ±5% points from the mean coupler curve. Keeping the above in mind, it is evident from FIG. 2 that for $\Delta_{2-3}$ about 0.07%, TL of 16.2 mm produced the best achromatic coupler as defined by the lowest achromaticity (i.e., less than about 20% points) whereas, for $\Delta_{2-3}$ about 0.12%, PL in the order of 18 mm produced the best achromatic coupler (i.e., an achromaticity of less than about 20% points).

Figure 3A:
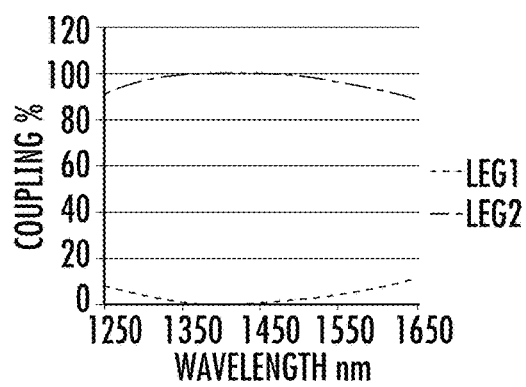
FIG. 3A illustrates a coupling curve for a coupler having a $\Delta_{2-3}$ value of about 0.12% over a range of wavelengths according to one or more embodiments described and illustrated herein.
Figure 3B:
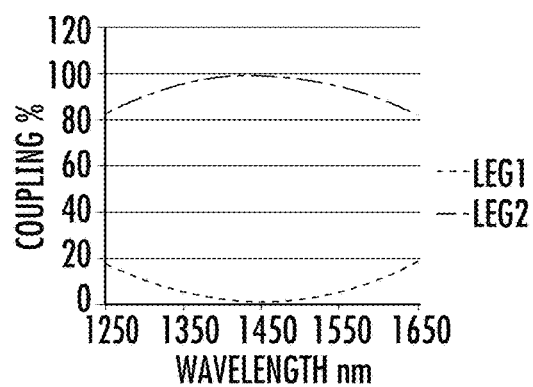
FIG. 3B illustrates a coupling curve for a coupler having a $\Delta_{2-3}$ value of about 0.07% over a range of wavelengths according to one or more embodiments described and illustrated herein.

FIG. 3A plots the wavelength of an optical signal inputted into an unbent coupler having a $\Delta_{2-3}$ value of about 0.12% and a taper length TL=18 mm. FIG. 3B plots the wavelength of an optical signal inputted into an unbent coupler having a $\Delta_{2-3}$ value of about 0.07% and a taper length TL=16.2. FIG. 3A and FIG. 3B illustrate that the difference between the maximum coupling percentage and the minimum coupling percentage at each output leg is less than 20% for each coupler. Thus, the two couplers of FIGS. 3A and 3B have relatively low achromaticity and are therefore suitable couplers.

Figure 7:
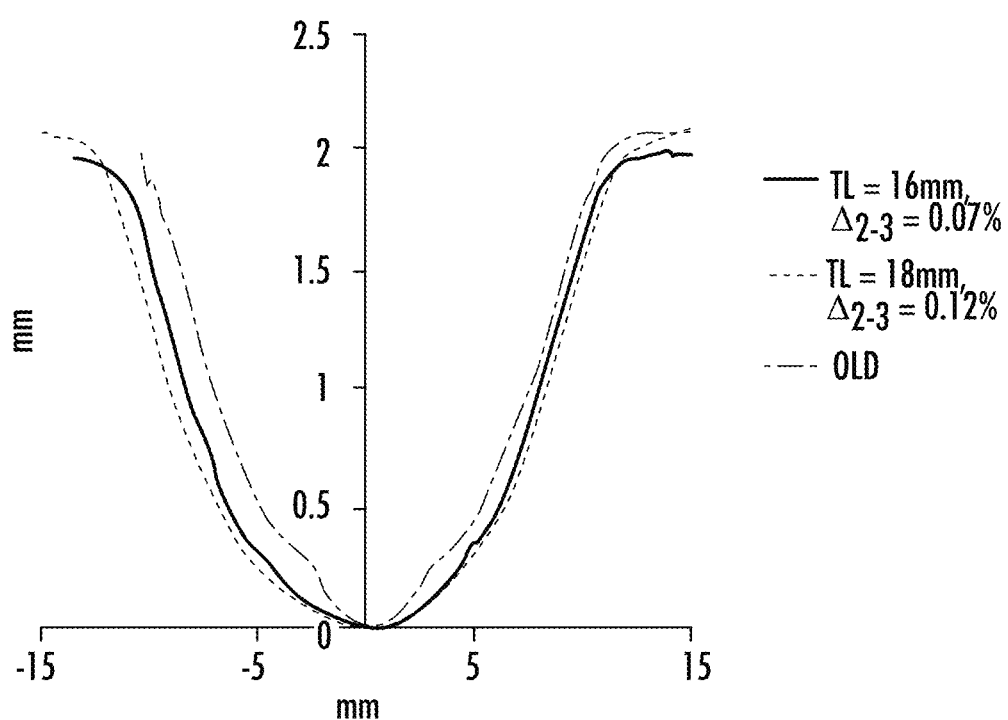
FIG. 7 illustrates a graph plotting taper profiles for two couplers having different $\Delta_{2-3}$ values and a prior art coupler according to one or more embodiments described and illustrated herein.

It was discovered that if the achromaticity value, over the bandwidth of 1250-1650 nm, for any output leg of the coupler when the coupler is straight (i.e. not bent), is less 16-18% points, then the coupler can meet the achromaticity as shown in FIG. 7, which is described in more detail below. Couplers with achromaticity of 10-14% points, at unbent state, as shown by one example in FIG. 3A, have the best spectral flatness. In all of these couplers, in its formed state, that is when the coupler is unbent, most of the power (>90% for almost all of the wavelengths) is on the ball term/terminated leg which may be called LEG2 for ease of identification. Minimum power is thus available on the through fiber output which may be called LEG1.

The couplers 100 described herein are not only capable of providing a static split ratio, but are also capable of providing a dynamic, variable split ratio. If the input end, which contains just the first optical waveguide 102 which passes fully through the glass tube 110, is held fixed (i.e., cantilevered in some support) and the output side containing both LEG1 and LEG2 (i.e., the first and second waveguides 102, 104 at the second end 114 of the glass tube 110) is bent with a force which lies on the plane of the two fibers, the optical power gradually transfers from LEG2 to LEG1 and the coupling curves become more achromatic.

Referring once again to FIG. 1, the coupler 100 may include an actuator 120, such as a piston, that can apply a deflection force to the second end 114 of the glass tube 110. Because the first end 112 of the glass tube 110 is fixed, such as fixed to an external housing (not shown), the glass tube 110 will be bent, which causes the split ratio of the coupler 100 to change.

Figure 4A:
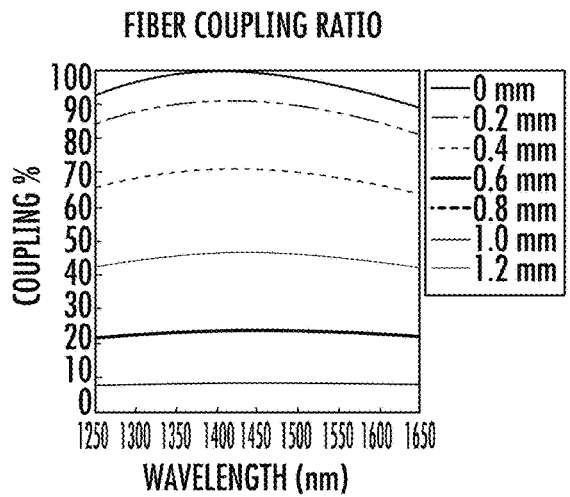
FIG. 4A illustrates a coupling curve for a coupler having a $\Delta_{2-3}$ value of about 0.12% over a range of wavelengths and a plurality of deflection amounts according to one or more embodiments described and illustrated herein.
Figure 4B:
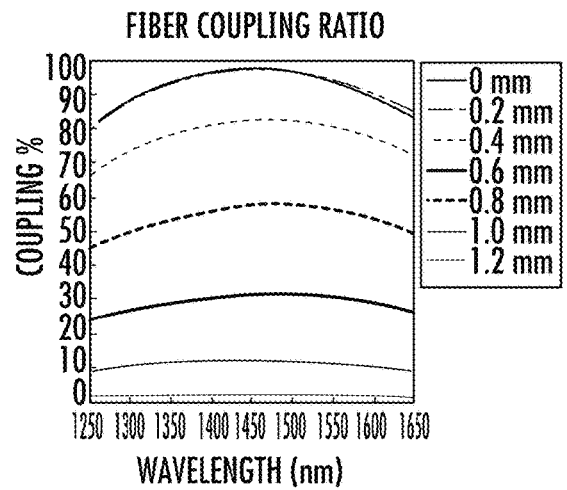
FIG. 4B illustrates a coupling curve for a coupler having a $\Delta_{2-3}$ value of about 0.07% over a range of wavelengths and a plurality of deflection amounts according to one or more embodiments described and illustrated herein.

The variation of the coupling curve with deflection is shown in FIGS. 4A and 4B for LEG2 of the two devices with different $\Delta_{2-3}$ values illustrated by FIGS. 3A and 3B, respectively. If the LEG2 is considered as the tap for use in a VRC, excellent wavelength independent coupling curves are observed in the tap range of 50% to 2% for such devices. It is again noted that the achromaticity improves as the optical power transfers from LEG2 to LEG1. Typically, the couplers are bent up to 1.15 mm and 50% to 2% tap occurs in a deflection range of about 0.6 mm.

Figure 5A:
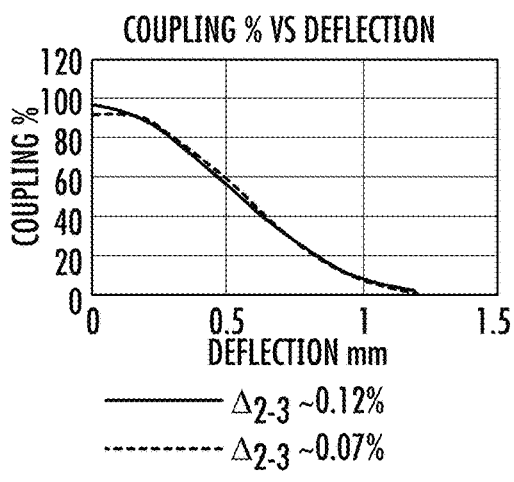
FIG. 5A illustrates a graph plotting the coupling percentage against coupler deflection for two different $\Delta_{2-3}$ values according to one or more embodiments described and illustrated herein.
Figure 5B:
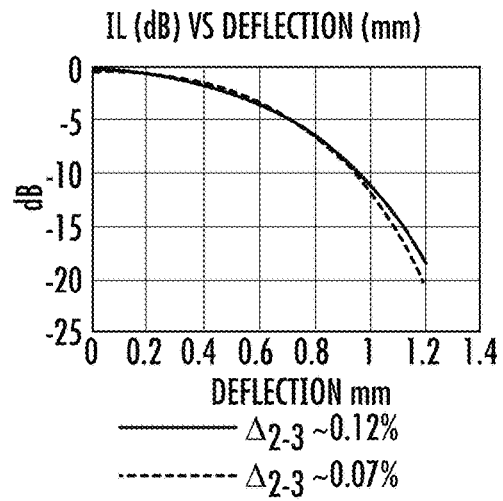
FIG. 5B illustrates a graph plotting the insertion loss against coupler deflection for two different $\Delta_{2-3}$ values according to one or more embodiments described and illustrated herein.

The deflection characteristics of such broadband achromatic couplers are similar even if the $\Delta_{2-3}$ values and consequently the taper lengths are different, which is illustrated by FIGS. 5A and 5B plotting the coupling percentage (FIG. 5A) and insertion loss (IL) (FIG. 5B) against coupler deflection at the output end of two devices having different $\Delta_{2-3}$ values. Although the two couplers shown by FIGS. 5A and 5B have equivalent deflection responses, their taper profiles for the tapered regions 113 are different, which is illustrated by FIG. 6.

Figure 6:
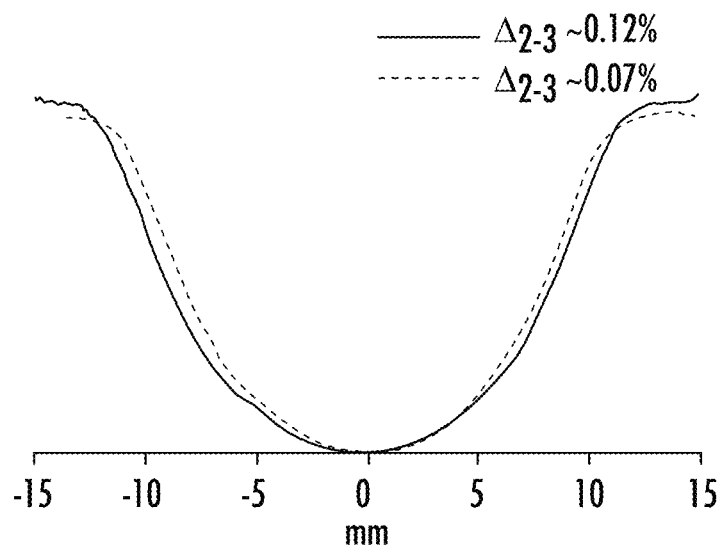
FIG. 6 illustrates a graph plotting taper profiles for two couplers having different $\Delta_{2-3}$ values according to one or more embodiments described and illustrated herein.

FIG. 6 illustrates the taper profiles for the couplers of FIGS. 3A (TL about 16 mm for $\Delta_{2-3}$ about 0.07%) and 3B (TL about 18 mm $\Delta_{2-3}$ about 0.12%). The minimum diameters for the tapered region, also referred to as the neck diameters, are around 660 microns and 570 microns, respectively. As shown by FIG. 6, achromatic couplers with $\Delta_{2-3}$ values of about 0.12% have shallower taper and their achromaticity is better than the other class with $\Delta_{2-3}$ values of about 0.07% as observed in FIGS. 3B and 4B. As a non-limiting example, the outer diameter of the glass tube 110 may be an average of 2.65 mm, and the minimum neck diameters are in the range of 0.55 to 0.66 mm, including endpoints, which means a neckdown/taper/draw ratio of 4.0-4.7.

The slope of the taper of the tapered region for couplers with $\Delta_{2-3}$ values of about 0.12% is slightly smaller than for those with $\Delta_{2-3}$ values of about 0.07%. The slope for couplers made using TL about 16 mm for $\Delta_{2-3}$ about 0.07% are approximately 0.78 while that for couplers made using TL about 18 mm for $\Delta_{2-3}$ about 0.12% are approximately 0.76. The slope is calculated based on the coordinates of the points on the untapered portion of the taper profile curves with respect to the middle point of the profile. It is observed that comparable achromaticity is achieved as the slope is increased by about 2% as the $\Delta_{2-3}$ decreases from 0.12% to 0.07%, keeping other parameters constant. As per FIGS. 3A, 3B, 4A, 4B and 6, as the $\Delta_{2-3}$ value increases, the best achromaticity is achieved with a longer taper length TL and a resulting shallower taper as the pulling speed/draw speed and flame conditions are kept the same wherein the minimum/neck diameter of the tapered region is reduced in comparison to those couplers with $\Delta_{2-3}$ values of about 0.07%.

It may be noted that previous achromatic couplers have a steeper taper profile as compared to those of the present disclosure, as observed by the curves of FIG. 7. FIG. 7 plots the taper profile curves for a coupler having a taper length TL of about 16 mm and a $\Delta_{2-3}$ value of about 0.07%, a coupler having a taper length TL of about 18 mm and a $\Delta_{2-3}$ value of about 0.12%, and a conventional achromatic coupler made following the process described in U.S. Pat. No. 7,627,214B2 which used dissimilar fibers. As shown by FIG. 7, the two couplers of the present disclosure having an ideal taper length and $\Delta_{2-3}$ value have a steeper and wider taper profile than the old coupler.

Figure 8:
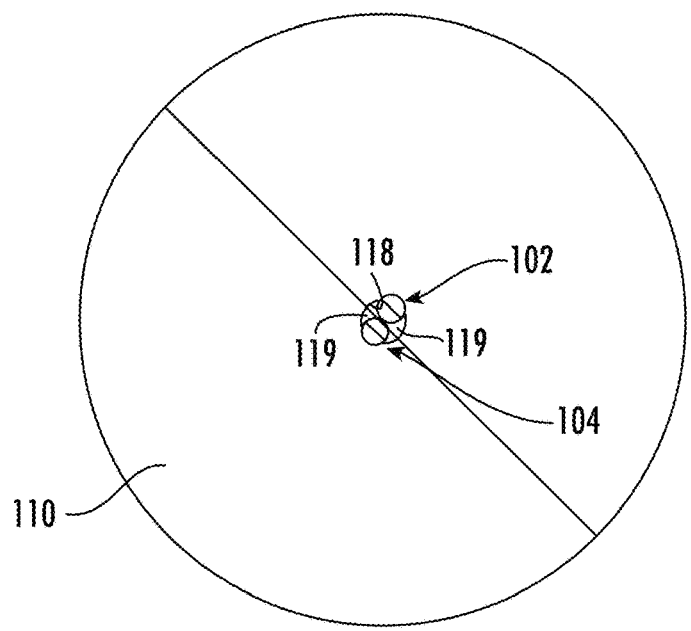
FIG. 8 illustrates a cross-sectional view of a coupler showing airlines between optical waveguides and an inner wall of a glass tube according to one or more embodiments described and illustrated herein.

Referring now to FIG. 8, the couplers of the present disclosure also include airlines 119 that are defined by interstitial voids between the inner wall 117 of the glass tube 110 and the surface of the first and second optical waveguides 102, 104. This means that even in the tapered region 113 there exists space between the collapsed optical waveguides 102, 104 and the surrounding glass tube 110. Without being bound by theory, it is believed that the presence of airlines 119 help improve the achromaticity of the coupler.

Figure 9:
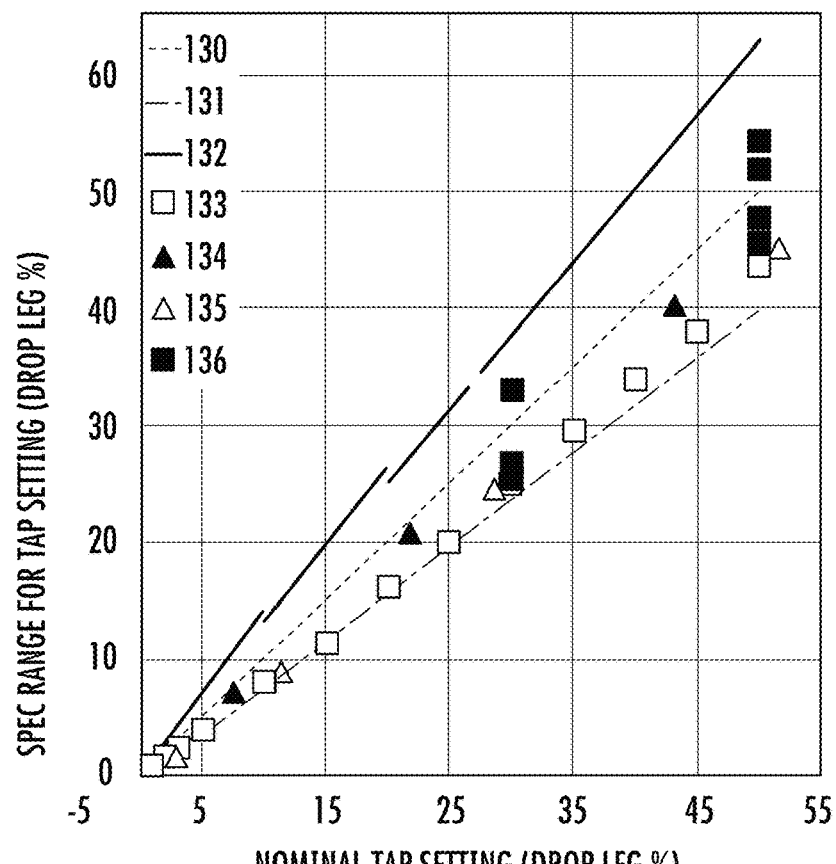
FIG. 9 illustrates deviation from true achromaticity for couplers of the present disclosure as well as prior art fixed ratio fused biconic taper couplers.

Thus, the couplers 100 of the present disclosure perform very well over broad bandwidths. As another advantage, a single coupler can be operated as a VRC by being bent to produce a multitude of tap ratios (i.e., split ratios) with minimal deviation from true achromaticity in comparison to fixed ratio FBT couplers. FIG. 9 illustrates deviation from true achromaticity of couplers of the present disclosure as compared to fixed ratio FBT couplers. Curve 130 represents a perfectly flat, ideally achromatic coupler. Curves 131 and 132 represent a tolerance band with allowable deviation from the ideal behavior represented by curve 130. Curve 131 represents a positive tolerance. Curve 132 represents a negative tolerance. The values on the Y-axis of FIG. 9 are calculated based on Table 1.

TABLE 1

|  | For 2.5-9% | For 10-19% | For 20-50% |
| --- | --- | --- | --- |
| Accuracy of each tap setting | ±1.5 dB | ±1.2 dB | ±1.0 dB |

Data points 133 represent a first fixed ratio FBT coupler. Data points 134 represent a coupler where the $\Delta_{2-3}$ value is about 0.07%. Data points 135 represent a coupler where the $\Delta_{2-3}$ value is about 0.12%. Data points 136 represent a second fixed ratio FBT coupler. The deviations for broadband variable ratio couplers are calculated for the window 1260-1360 nm and 1450-1650 nm. The maximum deviation in this composite window of 300 nm bandwidth is plotted against the nominal tap setting. From FIG. 9 it is observed that such devices offer a great advantage for the VRC as the deviation from true achromaticity (signified by the straight line) is equal or lower compared to fixed split ratio FBTs in most of the cases.

The excess loss for the couplers of the present disclosure is low, e.g., about 0.08 dB at 1310 nm and about 0.12 dB at 1550 nm for the majority of the devices, in the straight/undeflected state. The mean excess loss for any device, considering all wavelengths for the bandwidth 1250-1650 nm is ≤0.1 dB in any state. The mean excess loss is observed to vary from 0.02-0.05 to 0.08-0.12 dB at 1310 nm, as the deflection changes from 0 to 1.2 mm. The maximum excess loss occurs in the wavelength range of 1550-1650 nm and is generally between 0.1-0.18 dB. The polarization dependent loss or PDL is also generally ≤0.14 dB for both LEG1 and LEG2 over the tap range of 50%-2%. The return loss for the ball-terminated LEG2 is typically above 65 dB.

Figure 10:
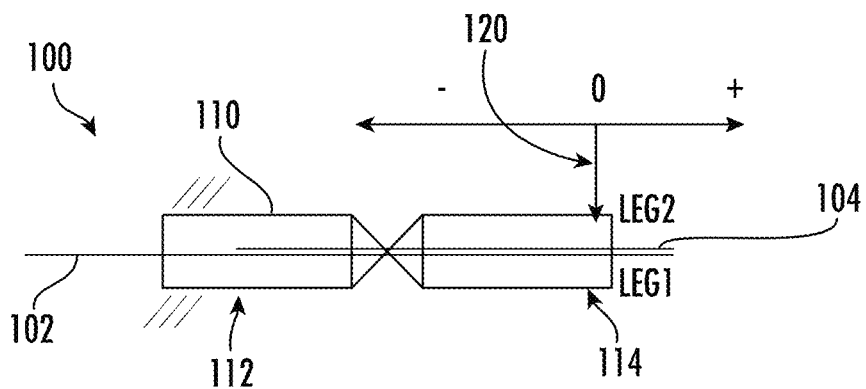
FIG. 10 illustrates a variable ratio coupler having an adjustable actuator capable of changing a position of applied deflection force according to one or more embodiments described and illustrated herein.
Figure 11:
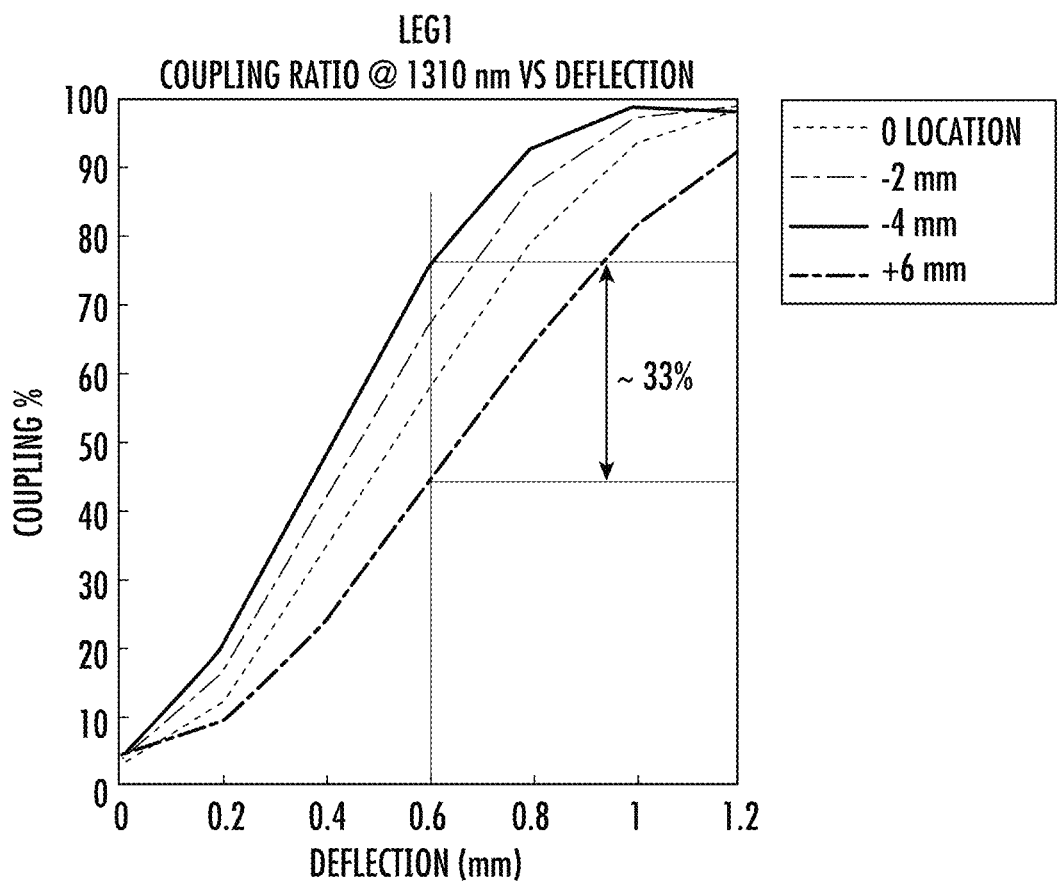
FIG. 11 illustrates a graph plotting coupling percentage against deflection values at a plurality of deflection force locations according to one or more embodiments described and illustrated herein.

In the embodiments of the present disclosure, as the coupler 100 is deflected at the second end 114 and most of the coupling takes place due to deformation in the middle region of the taper, the amount of deflection and thus the coupling percentage can be controlled by moving the point of application of force longitudinally along the glass tube 110. FIG. 10 illustrates how a location of the application of deflection force on the glass tube 110 by an actuator 120 can be adjusted. It is observed that the coupling percentage at 1310 nm changes in a quasi-linear manner with respect to the location of the deflecting force. FIG. 11 plots the coupling percentage against the deflection amount for a plurality of force application locations, where zero represents a neutral location on the second end 114 of the glass tube 110. Thus, the location of the application of the deflection force may be leveraged to obtain a desired coupling percentage. It is observed that the coupling percentage at 1310 nm changes in a quasi-linear manner with respect to the location of the deflecting force. It is also observed that the difference in coupling percentage for LEG1 of the coupler is 33% points for the two extreme positions (−4 mm and +6 mm with respect to the neutral location). Movement of the application of the deflection force may provide finer coupler percentage control.

Figure 12:
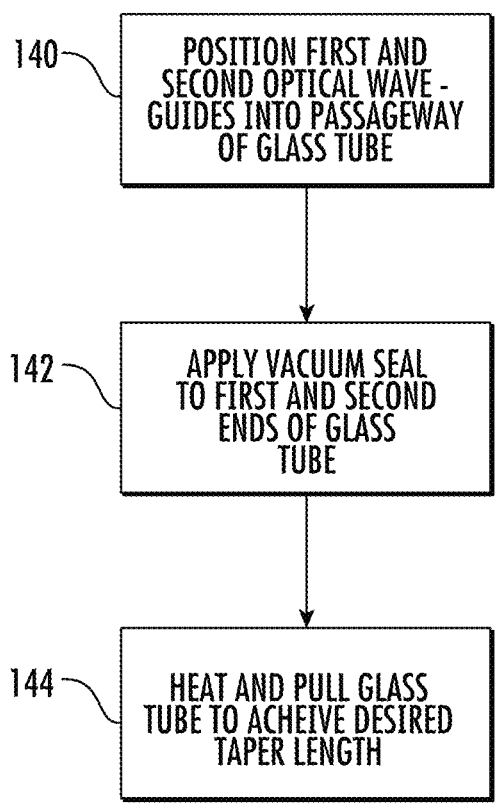
FIG. 12 illustrates a flowchart of an example method of fabricating a coupler according to one or more embodiments described and illustrated herein.
Figure 13:
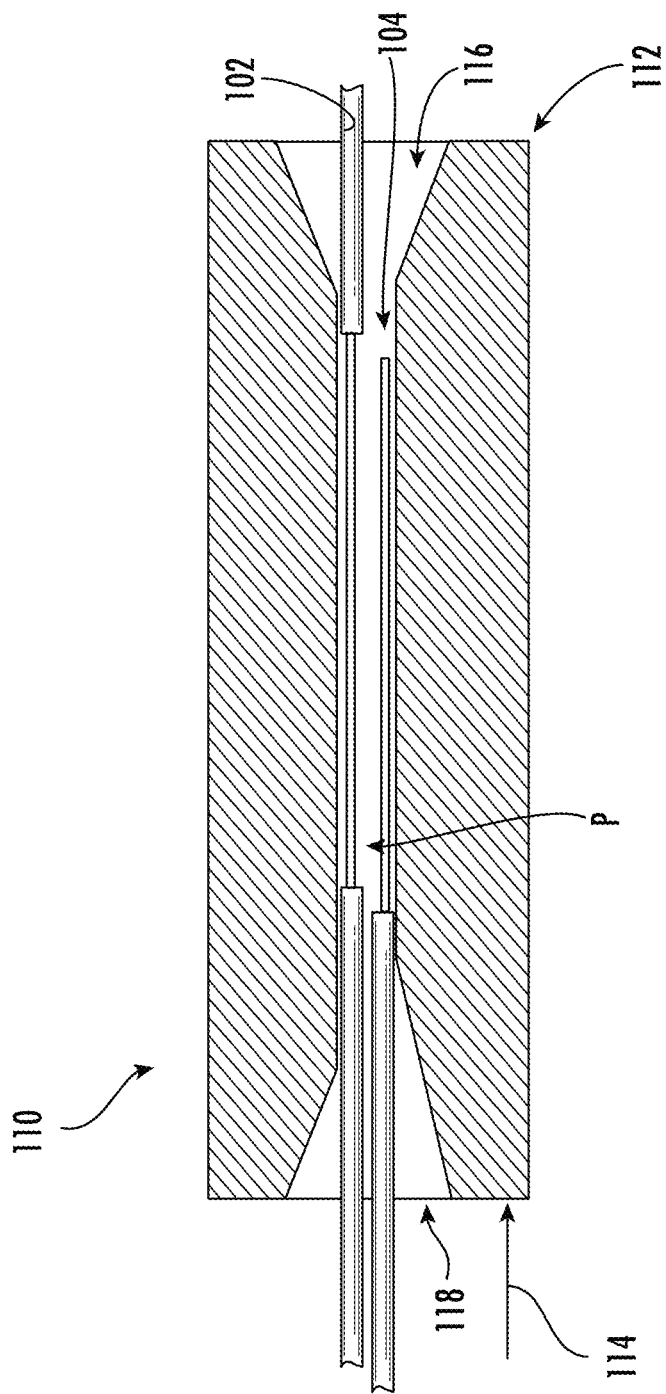
FIG. 13 illustrates a first and second optical waveguide inserted into a glass tube prior to forming a tapered region according to one or more embodiments of the present disclosure.

Referring now to FIG. 12, a flowchart representing an example method of making a coupler according to embodiments of the present disclosure is illustrated. At block 140, first and second optical waveguides 102, 104 are inserted into a passageway P of a glass tube 110, as shown in FIG. 13. When the first and second optical waveguides 102, 104 are optical fibers, a predetermined length of coating is stripped off, such as by use of a hot nitrogen stripper. The passageway P may have a first taper 116 at the first end 112 and/or a second taper 118 at the second end 114 defining funnels to guide the first and second optical waveguides 102, 104 into the passageway P, for example. The second optical waveguide 104 may be terminated within the passageway P to minimize back reflections of the optical signal. The terminated end of the second optical waveguide 104 may be done by using a torch to form a ball prior to insertion into the passageway P.

Next, at block 142, a vacuum seal is applied to both the first and second ends 112, 114 of the glass tube 110. At block 144 the glass tube 110 is heated at the center for a period of time (e.g., 14-17 seconds) using a split ring burner while at the very ends the glass tube is stretched in opposite directions at a draw speed for a pre-determined tapered length (also called a pull length), using linear stages to form the 1×2 coupler 100 shown in FIG. 1. An epoxy is then applied on both ends of the glass tube 110 to seal it through UV curing. As a non-limiting example, the glass tube 110 is heated by a split ring burner using a gas mixture having a gas flow ratio of methane to oxygen of 0.42 slpm/0.84 slpm. Below this gas flow ratio, the desired tapered profile and neckdown ratio may be difficult to achieve as the flame temperature may not be hot enough. Additionally, the oxygen of the gas mixture should be less than or equal to 0.9 slpm to prevent the collapse of the airlines 119.

It is noted that for draw speed of 16 mm/sec, and a gas flow ratio of methane to oxygen of 0.42 slpm/0.84 slpm, one may not need to consider the exact pull length required, if the glass tube is pulled until LEG2 has >95% power, at 1450 nm, for glass tubes and optical waveguides satisfying 0.07% $\Delta_{2-3} \leq 0.125\%$. This will ensure that the desired achromaticity is achieved in the bandwidth 1250-1650 nm. It can be seen that in such a scenario LEG2 always has the maximum power in the vicinity of 1450 nm.

Embodiments of the present disclosure are also directed to a novel method of sealing the first and second ends 112, 114 of the glass tube 110 using a UV curable epoxy. The airlines 119 of the couplers 100 described herein vent to both ends of the glass tube 110, which make it difficult to control the thermally generated vacuum independent of the first and second ends 112, 114 of the glass tube 110. This causes the epoxy on the upper side to draw in while preventing the epoxy at the bottom side from drawing into the passageway P.

A well-applied epoxy is characterized by adequate fill depth where the epoxy occupies the tapered funnel and travels at least 2-3 mm into the passageway P of the glass tube 110. This enables proper transmission of the outside stress on the first and second optical waveguides 102, 104 due to any environmental or accidental tug/pull onto the glass tube 110 walls through the cured epoxy, and lowers the probability of failure. The fill depth is specified as the distance travelled by the epoxy past the funnels (i.e., the first and second tapers 116, 118) in the glass tube 110. A fill depth between 2-5 mm, past the funnel, is desired based on reliability studies. The flow of the epoxy depends on the ambient temperature, viscosity, and time for which it was out and in use on the coupler draw. There is some variation from batch to batch and good fill depth was not achieved with normal application.

Figure 14:
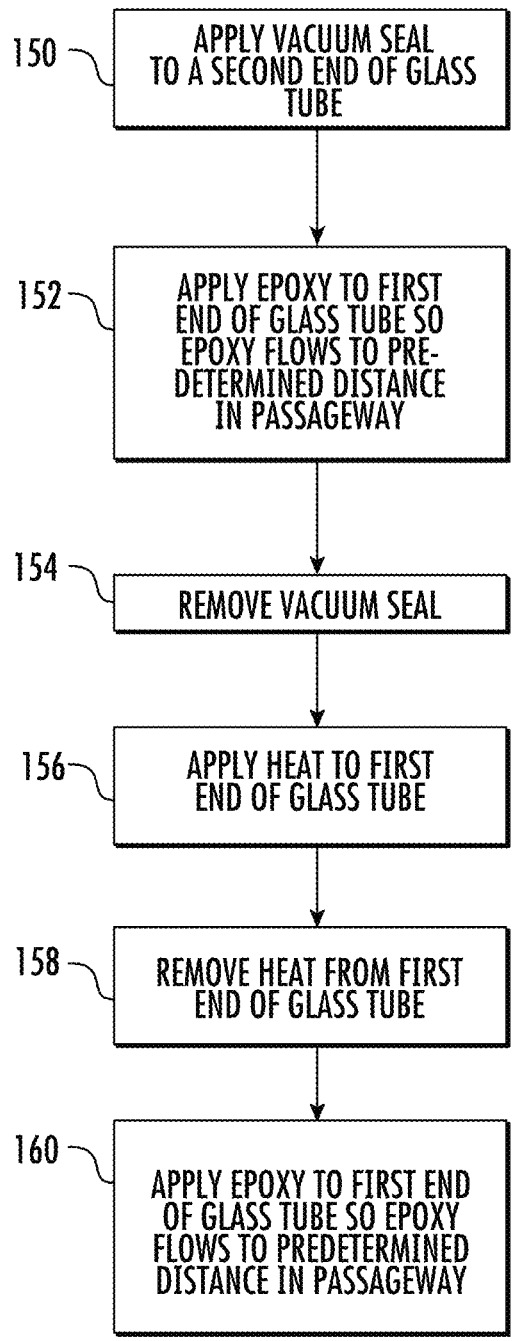
FIG. 14 illustrates a flowchart of an example method of sealing a coupler according to one or more embodiments of the present disclosure.

FIG. 14 is a flowchart of an example epoxy application method that overcomes the problems described above. At block 150, after the usual tapering of the coupler 100 as described above, the top vacuum seals are closed, and a vacuum is applied to the second end 114 of the glass tube 110. At block 152 an epoxy is then applied to the bottom funnel at the input side (i.e., first end 112). The vacuum pull thus created is sufficient to fill the entire funnel with epoxy and draw it inwards into the passageway P. A UV knife may be used to stop any further movement of the epoxy than required. A main UV wand cures the remaining epoxy.

At block 154 the vacuum seals are removed. Once the bottom funnel at the first end 112 of the glass tube 110 is sealed, heat is applied to the top funnel at the second end 114 of the glass tube for a period of time at block 156. As a non-limiting example, the period of time is two to six seconds. As a non-limiting example, the burner may be split ring burner having a gas flow ratio of methane to oxygen equal to 0.42 slpm/0.84 slpm. After the period of time, the heat is removed at block 158. Then, epoxy is applied to the top funnel of the second end 114 of the glass tube 110. The residual heat from the burner helps in augmenting the flow of the epoxy, such that it can wick inwards and the desired depth is achieved.

Figure 15A:
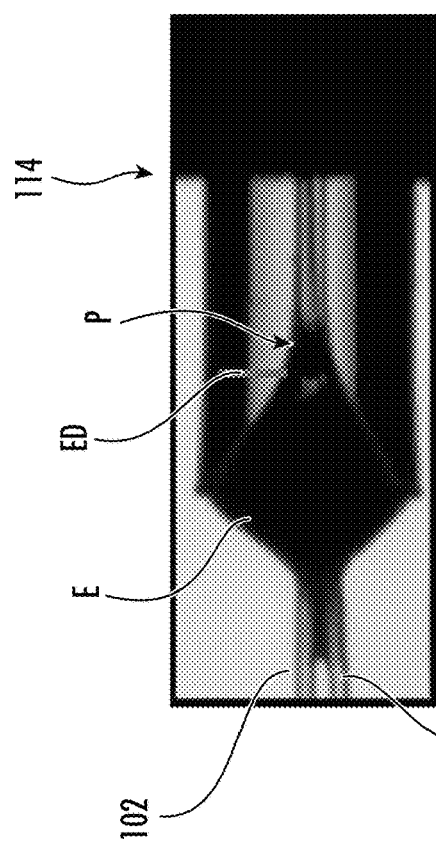
FIGS. 15A and 15B illustrate epoxy flow in a glass tube without performing vacuum and heating steps.
Figure 15B:
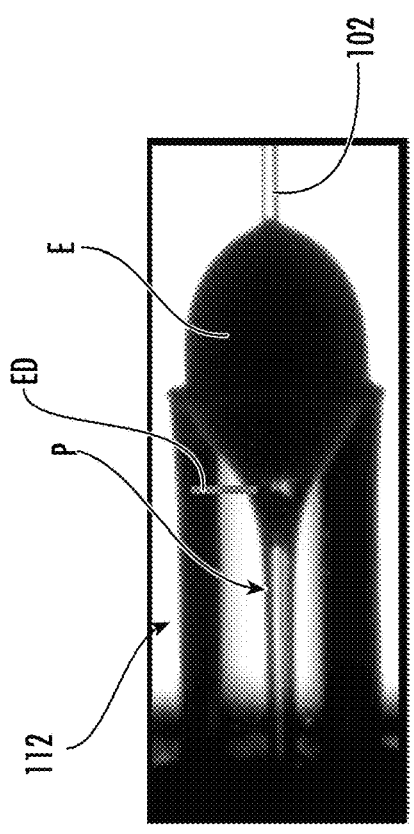

FIGS. 15A and 15B illustrate an epoxy E that was applied without the effect of the vacuum and heating process illustrated by FIG. 14. FIG. 15A shows epoxy E at the first end 112 of the glass tube 110 without the use of a vacuum. Line ED shows the extent of travel of epoxy E into the passageway P. The end of the epoxy E does not extend past the funnel defined by the tapered walls, and does not enter the narrow bore of the passageway P. FIG. 15B shows epoxy E at the second end 114 of the glass tube 110 without applying heat. Line ED shows the extent of travel of epoxy E into the passageway P. Like FIG. 15A, the epoxy E does not extend past the funnel defined by the tapered walls, and does not enter the narrow bore of the passageway P.

Figure 16A:
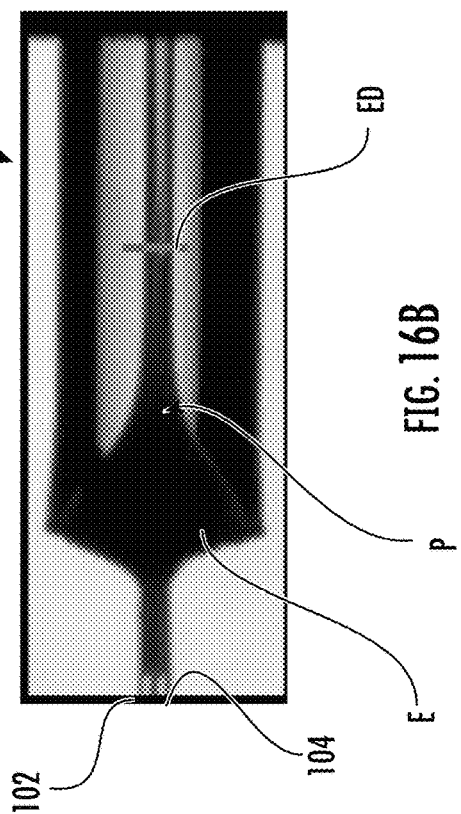
FIGS. 16A and 16B illustrate epoxy flow in a glass tube with performing the vacuum and heating steps of the flowchart of FIG. 14 according to one or more embodiments described and illustrated herein.
Figure 16B:
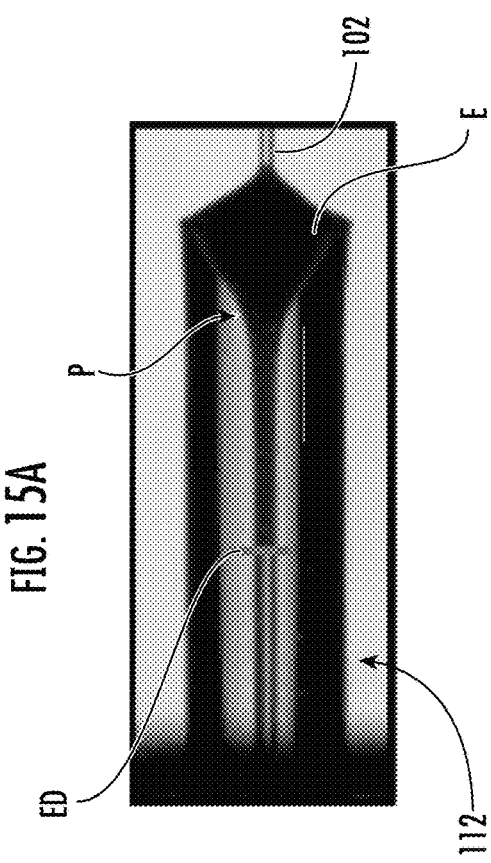

FIGS. 16A and 16B illustrates a sealed coupler using the process illustrated by FIG. 14. FIG. 15A shows epoxy E at the first end 112 of the glass tube 110 with the use of a vacuum (vacuum pull time: 12 seconds, vacuum level: 6 inHg). Line ED shows the extent of travel of epoxy E into the passageway P. The end of the epoxy E extends well past the funnel defined by the tapered walls, and enters deeply into the narrow bore of the passageway P. FIG. 15B shows epoxy E at the second end 114 of the glass tube 110 after applying heat. Line ED shows the extent of travel of epoxy E into the passageway P. Like FIG. 16A, the epoxy E does extend past the funnel defined by the tapered walls, and extends deeply into the narrow bore of the passageway P. In comparing the coupler of FIGS. 15A-15B and the coupler of FIGS. 16A-16B, it is clear that the process of FIG. 14 improves the wicking of the epoxy and thus the sealing of the coupler 100.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured"

denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A coupler comprising:
a glass tube having a refractive index $n_3$ and comprising a passageway;
a first optical waveguide and a second optical waveguide positioned within the passageway, each of the first optical waveguide and the second optical waveguide comprising a core surrounded by a cladding, and one or more airlines between one or more of the first optical waveguide and the second optical waveguide and an inner surface of the passageway wherein:
the glass tube further comprises a tapered region having a taper length;
a coupling region is present between the first optical waveguide and the second optical waveguide within the tapered region;
a refractive index of the cladding is less than a refractive index of the core, and a lowest refractive index of the cladding of the first optical waveguide and the second optical waveguide is $n_2$; and
$n_3$ is lower than $n_2$ such that a value of $\Delta_{2-3}$ is $0.07\% \leq \Delta_{2-3} \leq 0.125$, where $\Delta_{2-3}$ equals $(n_2^2-n_3^2)/2 n_2^2$, and wherein the coupler is configured to be deflected at the tapered region for changing a split ratio of the coupler and an optical loss of the coupler is about 0.08 dB or less at an optical wavelength of 1310 nanometers in the undeflected state.

2. The coupler of claim 1, wherein the taper length is within a range of 16 mm to 19 mm, including endpoints.

3. The coupler of claim 2, wherein the tapered region has a taper slope within a range of 0.76 to 0.78, including endpoints.

4. The coupler of claim 1, wherein the taper length is such that the coupler has an achromaticity value <20% over a wavelength bandwidth of 1250 nm-1650 nm, including endpoints, when the coupler is in an unbent state.

5. The coupler of claim 1, wherein $\Delta_{2-3}$ is 0.07% and the taper length is about 16.2 mm.

6. The coupler of claim 1, wherein $\Delta_{2-3}$ is 0.12% and the taper length is about 18 mm.

7. The coupler of claim 1, wherein the one or more airlines defined by interstitial voids between an inner wall of the glass tube and respective surfaces of the first optical waveguide and the second optical waveguide.

8. The coupler of claim 1, wherein the first optical waveguide and the second optical waveguide each comprise a single-mode optical fiber.

9. A variable ratio coupler comprising:
a glass tube having a refractive index $n_3$ and comprising a passageway;
a first optical waveguide and a second optical waveguide positioned within the passageway, each of the first optical waveguide and the second optical waveguide comprising a core surrounded by a cladding, and one or more airlines between one or more of the first optical waveguide and the second optical waveguide and an inner surface of the passageway wherein:
the glass tube further comprises a tapered region having a taper length;
a coupling region is present between the first optical waveguide and the second optical waveguide within the tapered region;
a refractive index of the cladding is less than a refractive index of the core, and a lowest refractive index of the cladding of the first optical waveguide and the second optical waveguide is $n_2$;
$n_3$ is lower than $n_2$ such that a value of $\Delta_{2-3}$ is $0.07\% \leq \Delta_{2-3} \leq 0.125$, where $\Delta_{2-3}$ equals $(n_2^2-n_3^2)/2 n_2^2$;
the first optical waveguide is fixed; and
the second optical waveguide is configured to be deflected relative to the first optical waveguide to change a split ratio of the variable ratio coupler.

10. The variable ratio coupler of claim 9, wherein the taper length is within a range of 16 mm to 19 mm, including endpoints.

11. The variable ratio coupler of claim 10, wherein the tapered region has a taper slope within a range of 0.76 to 0.78, including endpoints.

12. The variable ratio coupler of claim 9, wherein the taper length is such that the variable ratio coupler has an achromaticity value <20% over a wavelength bandwidth of 1250 nm-1650 nm, including endpoints, when the variable ratio coupler is in an unbent state.

13. The variable ratio coupler of claim 9, wherein $\Delta_{2-3}$ is 0.07% and the taper length is about 16.2 mm.

14. The variable ratio coupler of claim 9, wherein $\Delta_{2-3}$ is 0.12% and the taper length is about 18 mm.

15. The variable ratio coupler of claim 9, wherein greater than 90% of optical power of an optical signal passes through the first optical waveguide when the second optical waveguide is in an unbent state.

16. The variable ratio coupler of claim 15, wherein an amount of optical power of an optical signal passing through the first optical waveguide decreases and an amount of optical power of an optical signal passing through the second optical waveguide increases as the second optical waveguide is deflected.

17. The variable ratio coupler of claim 9, further comprising an actuator configured to deflect the second optical waveguide at a force application location on the glass tube.

18. The variable ratio coupler of claim 17, wherein the actuator is configured to adjust the force application location in a longitudinal location on the glass tube.

19. The variable ratio coupler of claim 9, wherein the one or more airlines defined by interstitial voids between an inner wall of the glass tube and respective surfaces of the first optical waveguide and the second optical waveguide.

20. The variable ratio coupler of claim 9, wherein the first optical waveguide and the second optical waveguide each comprise a single-mode optical fiber.

21. A method of fabricating a coupler, the method comprising:
positioning a first optical waveguide and a second optical waveguide into a passageway of a glass tube, wherein:
each of the first optical waveguide and the second optical waveguide comprising a core surrounded by a cladding, wherein:
a refractive index of the cladding is less than a refractive index of the core, and a lowest refractive index of the cladding of the first optical waveguide and the second optical waveguide is $n_2$; and
$n_3$ is lower than $n_2$ such that a value of $\Delta_{2-3}$ is $0.07\% \leq \Delta_{2-3} \leq 0.125$, where $\Delta_{2-3}$ equals $(n_2^2 - n_3^2)/2 n_2^2$;
applying a vacuum seal to a first end and a second end of the glass tube;
heating the glass tube using a gas having a methane to oxygen flow ratio of 0.42 slpm to 0.84 slpm wherein oxygen is less than 0.90 slpm; and
pulling the glass tube to form a tapered region having a taper length, wherein:
a coupling region is present between the first optical waveguide and the second optical waveguide within the tapered region; and
one or more airlines are present between one or more of the first optical waveguide and the second optical waveguide and an inner surface of the passageway, wherein the coupler is configured to be deflected at the tapered region for changing a split ratio of the coupler and an optical loss of the coupler is about 0.08 dB or less at an optical wavelength of 1310 nanometers in the undeflected state.

22. The method of claim 21, wherein the first optical waveguide and the second optical waveguide each comprise a single-mode optical fiber.

23. The method of claim 21, wherein the taper length is within a range of 16 mm to 19 mm, including endpoints.

24. The method of claim 23, wherein the tapered region has a taper slope within a range of 0.76 to 0.78, including endpoints.

25. The method of claim 21, wherein the taper length is such that the variable ratio coupler has an achromaticity value <20% over a wavelength bandwidth of 1250 nm-1650 nm, including endpoints, when the variable ratio coupler is in an unbent state.

26. The method of claim 21, wherein $\Delta_{2-3}$ is 0.07% and the taper length is about 16.2 mm.

27. The method of claim 21, wherein $\Delta_{2-3}$ is 0.12% and the taper length is about 18 mm.

28. The method of claim 21, further comprising sealing the first end and the second end with an epoxy.

29. A method of fabricating a coupler, the method comprising:
applying a vacuum seal to a first end of a glass tube having a passageway and a tapered region where the passageway is tapered, wherein a first optical waveguide and a second optical waveguide are disposed within the passageway and a coupled region between the first optical waveguide and the second optical waveguide is present within the tapered region;
applying an epoxy to a second end of the glass tube such that the epoxy flows a predetermined distance within the passageway;
removing the vacuum seal from the first end;
heating the second end with a heat source for a period of time; and
removing the heat source after the period of time and applying the epoxy to the second end such that the epoxy flows within the passageway, and wherein the coupler is configured to be deflected at the tapered region for changing a split ratio of the coupler and an optical loss of the coupler is about 0.08 dB or less at an optical wavelength of 1310 nanometers in the undeflected state.

30. The method of claim 29, wherein the heat source is a burner with a gas having a flow ratio of methane to oxygen of 0.42 slpm/0.84 slpm.

31. The method of claim 29, wherein the period of time is within the range of two to six seconds, including endpoints.

32. The method of claim 29, further comprising applying a UV knife to stop the flow of the epoxy at the predetermined distance.

33. The method of claim 29, further comprising UV curing the epoxy within the glass tube.

34. The method of claim 29, wherein:
each of the first optical waveguide and the second optical waveguide comprising a core surrounded by a cladding, wherein:
a refractive index of the cladding is less than a refractive index of the core, and a lowest refractive index of the cladding of the first optical waveguide and the second optical waveguide is $n_2$; and
$n_3$ is lower than $n_2$ such that a value of $\Delta_{2-3}$ is $0.07\% \leq \Delta_{2-3} < 0.125$, where $\Delta_{2-3}$ equals $(n_2^2 - n_3^2)/2 n_2^2$.

35. The coupler of claim 1, wherein a mean excess loss is about 0.12 dB or less at an optical wavelength of 1310 nanometers as the deflection changes from 0 to 1.2 millimeters.

36. The method of claim 21, wherein a mean excess loss is about 0.12 dB or less at an optical wavelength of 1310 nanometers as the deflection changes from 0 to 1.2 millimeters.

37. The method of claim 29, wherein a mean excess loss is about 0.12 dB or less at an optical wavelength of 1310 nanometers as the deflection changes from 0 to 1.2 millimeters.

* * * * *